United States Patent
Capozzi et al.

(10) Patent No.: US 7,107,144 B2
(45) Date of Patent: Sep. 12, 2006

(54) NON-INTRUSIVE TRAFFIC MONITORING SYSTEM

(75) Inventors: Jerry V. Capozzi, Bellbrook, OH (US); Michael R. Johnson, Beavercreek, OH (US); Gordon R. Little, Kettering, OH (US); Paul D. Zidek, Dayton, OH (US)

(73) Assignee: Spectra Research, Inc., Dayton, OH (US)

( * ) Notice: Subject to any disclaimer, the term of this patent is extended or adjusted under 35 U.S.C. 154(b) by 286 days.

(21) Appl. No.: 10/787,850

(22) Filed: Feb. 26, 2004

(65) Prior Publication Data

US 2004/0249561 A1 Dec. 9, 2004

Related U.S. Application Data

(60) Provisional application No. 60/450,408, filed on Feb. 27, 2003.

(51) Int. Cl.
- *G06G 7/76* (2006.01)
- *G06G 7/78* (2006.01)
- *G08G 1/00* (2006.01)
- *G01C 3/00* (2006.01)

(52) U.S. Cl. ............... 701/117; 342/454; 180/169; 702/159

(58) Field of Classification Search ........ 701/117–119; 702/159; 356/3.03; 340/435, 436; 180/167, 180/169; 342/453, 454, 456
See application file for complete search history.

(56) References Cited

U.S. PATENT DOCUMENTS

| | | | |
|---|---|---|---|
| 4,490,851 A | 12/1984 | Gerhart et al. | |
| 4,552,456 A * | 11/1985 | Endo | 356/5.06 |
| 4,727,258 A | 2/1988 | Tyssen et al. | |
| 4,947,353 A | 8/1990 | Quinlan, Jr. | |
| 5,066,950 A | 11/1991 | Schweitzer et al. | |
| 5,202,742 A * | 4/1993 | Frank et al. | 356/5.1 |
| 5,278,423 A | 1/1994 | Wangler et al. | |
| 5,298,738 A | 3/1994 | Gebert et al. | |
| 5,314,037 A * | 5/1994 | Shaw et al. | 180/169 |
| 5,381,155 A | 1/1995 | Gerber | |
| 5,392,034 A | 2/1995 | Kuwagaki | |

(Continued)

FOREIGN PATENT DOCUMENTS

EP 0 618 461 A2 10/1994

OTHER PUBLICATIONS

Benning et al., Multi-Lane Traffic Monitoring System (MTMS), 1998, 7 Pages, SAE Publications Group, Warrendale, Aug. 11-13.

*Primary Examiner*—Y. Beaulieu
(74) *Attorney, Agent, or Firm*—Dinsmore & Shohl LLP (57) ABSTRACT

A traffic monitoring system including a non-intrusive lane monitor is provided. The lane monitor comprises one or more laser channels, a user interface, and a programmable controller in communication with the laser channels and the user interface. In accordance with one embodiment of the present invention, a pair of laser channels are provided. The first laser axis is substantially parallel to the second laser axis and the first and second laser axes lie substantially in a common horizontal plane. The programmable controller is configured to generate reflected laser pulse count corresponding to reflection of a pulsed laser signal from a target positioned along one of the laser axes and identify the reflected signal as a valid or invalid target by comparing the pulse count to a predetermined valid target count.

54 Claims, 3 Drawing Sheets

U.S. PATENT DOCUMENTS

| | | |
|---|---|---|
| 5,512,998 A | 4/1996 | Puschell |
| 5,529,138 A * | 6/1996 | Shaw et al. ............... 180/169 |
| 5,537,110 A | 7/1996 | Iida et al. |
| 5,546,188 A | 8/1996 | Wangler et al. |
| 5,617,199 A | 4/1997 | Dunne |
| 5,682,229 A | 10/1997 | Wangler |
| 5,752,215 A | 5/1998 | Zaaiman et al. |
| 5,757,472 A | 5/1998 | Wangler et al. |
| 5,806,020 A * | 9/1998 | Zykan ..................... 702/159 |
| 5,821,879 A | 10/1998 | Liepmann |
| 5,835,203 A | 11/1998 | Ogura et al. |
| 6,329,952 B1 * | 12/2001 | Grace ..................... 343/703 |

* cited by examiner

Fig. 3 tion; and
FIG. 3 is a schematic illustration of the manner in which
a target intercepts a pulsed laser signal according to one
embodiment of the present invention.

NON-INTRUSIVE TRAFFIC MONITORING SYSTEM

CROSS-REFERENCE TO RELATED APPLICATIONS

This application claims the benefit of U.S. Provisional Application Ser. No. 60/450,408, filed Feb. 27, 2003.

STATEMENT REGARDING FEDERALLY SPONSORED RESEARCH OR DEVELOPMENT

This invention was made with government support under Contract No. DTRS57-97-C-00097 awarded by the U.S. Department of Transportation and Contract No. F33615-97C-1052 awarded by the U.S. Air Force (AFRL/SNR). The Government has certain rights in this invention.

BACKGROUND OF THE INVENTION

The present invention relates to schemes for monitoring moving targets and, more particularly, to a non-intrusive, multi-lane traffic monitoring system.

BRIEF SUMMARY OF THE INVENTION

According to the present invention, a traffic monitoring system including a non-intrusive lane monitor is provided. The lane monitor comprises one or more laser channels, a user interface, and a programmable controller in communication with the laser channels and the user interface.

In accordance with one embodiment of the present invention, a pair of laser channels comprising first and second laser sources and first and second laser receivers is provided. The first laser source is configured to generate a first pulsed laser signal along a first laser axis. The first laser receiver is configured to detect individual reflected laser pulses from the first pulsed laser signal. The second laser channel comprises a second laser source and a second laser receiver. The second laser source is configured to generate a second pulsed laser signal along a second laser axis. The second laser receiver is configured to detect individual reflected laser pulses from the second pulsed laser signal. The first laser axis is substantially parallel to the second laser axis. The first and second laser axes lie substantially in a common horizontal plane. The first laser axis is offset from the second laser axis in the common horizontal plane by a laser channel offset distance x. The programmable controller is configured to generate reflected laser pulse count corresponding to reflection of a pulsed laser signal from a target positioned along one of the laser axes and identify the reflected signal as a valid or invalid target by comparing the pulse count to a predetermined valid target count.

In accordance with another embodiment of the present invention, the programmable controller is configured to generate the first and second laser signals at a pulse repetition frequency PRF of at least about:

$$PRF \approx \left(\frac{v}{px}\right)$$

where v corresponds to an expected average target speed, x corresponds to the channel offset distance and p corresponds to the desired percent precision in the speed determination. According to one embodiment of the present invention, for example, where the desired precision p is about 2%, the pulse repetition frequency PRF is equal to (v/0.02x).

In accordance with yet another embodiment of the present invention, the laser source is configured to generate pulsed laser signals having a cross sectional beam profile characterized by a minor axis of divergence and a major axis of divergence. The laser source is configured such that the minor axis of divergence lies in a substantially vertical plane the major axis of divergence lies in a substantially horizontal plane.

In accordance with yet another embodiment of the present invention, the programmable controller is configured to generate the first and second laser signals at a pulse repetition frequency sufficient to generate a plurality of reflected pulses as less than 1 inch (2.5 cm) of a target moving at a speed v intercepts one of the pulsed laser signals, the speed v being at least about 55 mph (90 km/h).

In accordance with yet another embodiment of the present invention, the laser receiver is placed in communication with a constant fraction discrimination circuit. The constant fraction discrimination circuit is configured to account for differences in respective rise times of laser pulses reflected from surfaces of differing reflectivity at a common range. The constant fraction discrimination circuit is also configured to combine a detected reflected signal pulse with a delayed, inverted replica to obtain a signal that is substantially independent of pulse amplitude.

Accordingly, it is an object of the present invention to provide an improved scheme for monitoring moving targets and, more particularly, for monitoring vehicular traffic on roadways. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
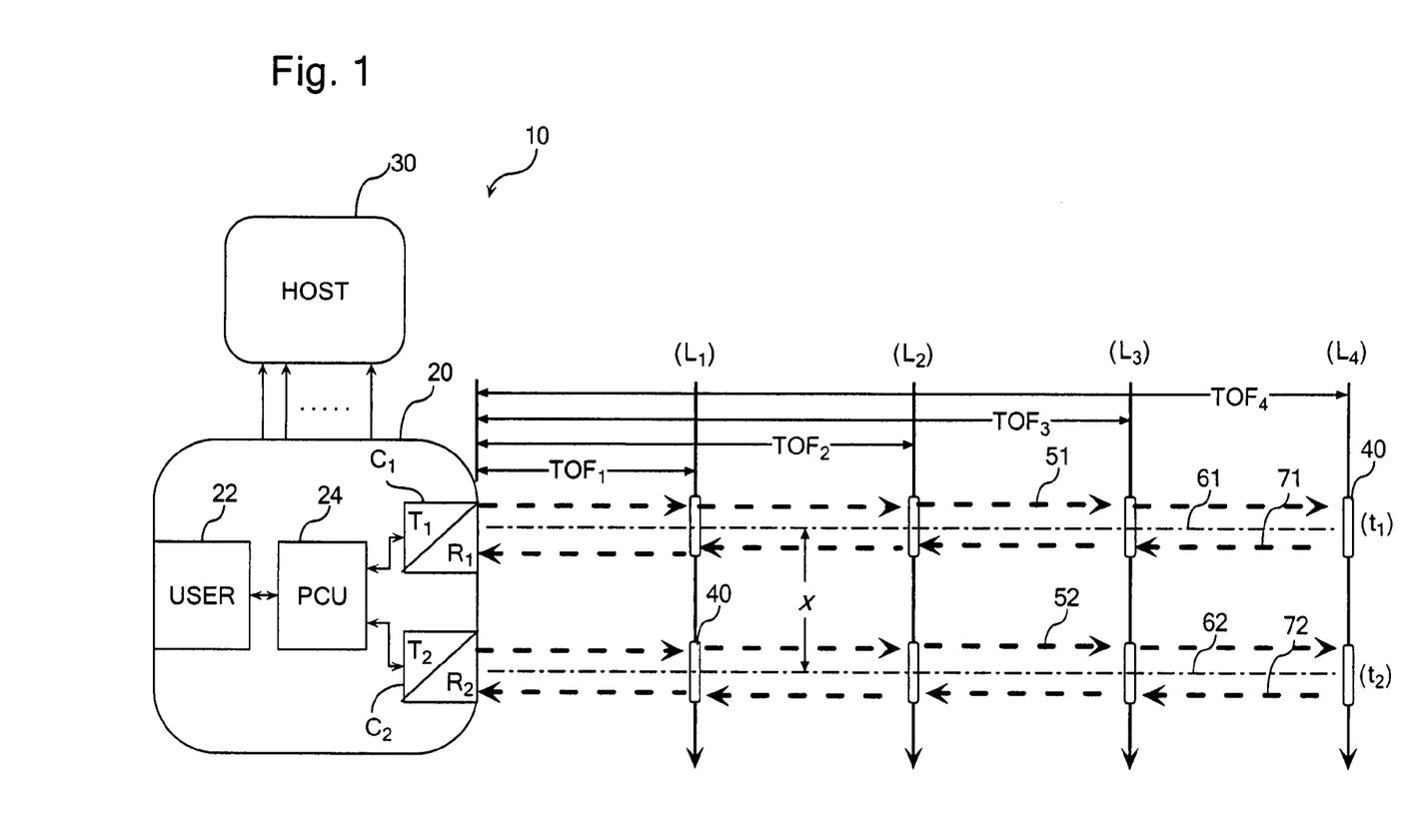
FIG. 1 is a schematic illustration of a traffic monitoring system according to one embodiment of the present invention.
Figure 2:
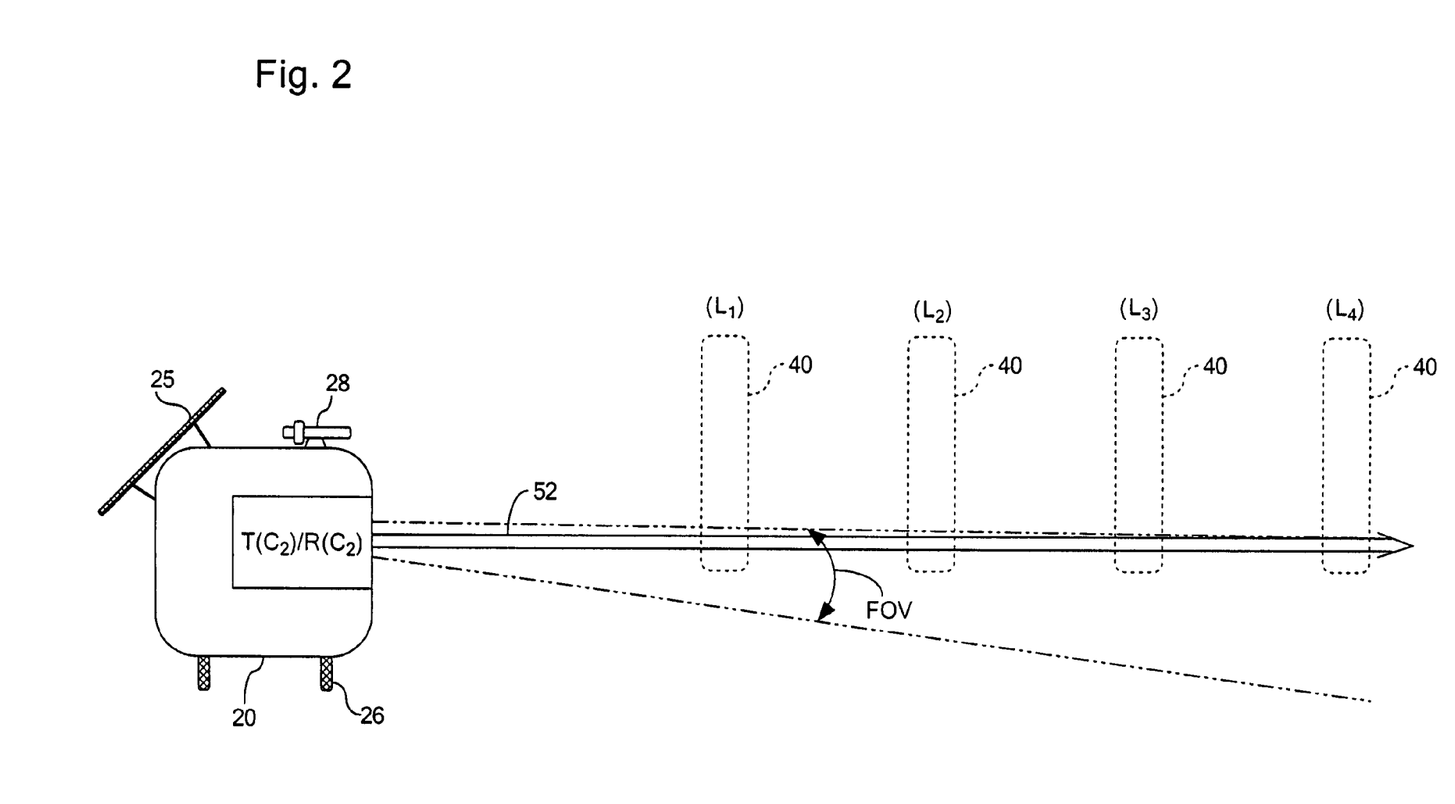
FIG. 2 is a schematic illustration of a lane monitor for use in a traffic monitoring system according to one embodiment of the present invention.

Referring initially to FIGS. 1 and 2, a traffic monitoring system 10 according to one embodiment of the present invention is illustrated. The traffic monitoring system 10 comprises a non-intrusive lane monitor 20, in communication with a host traffic counting unit 30. The lane monitor 20 comprises first and second laser channels $C_1$, $C_2$, a user interface 22, and a programmable controller 24 in communication with the first and second laser channels $C_1$, $C_2$ and the user interface 22. The first and second laser channels $C_1$, $C_2$ comprise respective first and second laser sources $T_1$, $T_2$ and first and second laser receivers $R_1$, $R_2$.

Each laser source is configured to generate respective pulsed laser signals 51, 52 along the first and second laser axes 61, 62 and to detect individual reflected laser pulses 71, 72 returning from a target 40 intercepting one of the pulsed laser signals 51, 52. The first and second laser axes 61, 62 are preferably directed substantially perpendicular to the roadway axis. The respective pulsed laser signals 51, 52 and the individual reflected laser pulses 71, 72 are graphically offset from the axes 61, 62 in FIG. 1 for clarity of illustration. It is also noted that a plurality of targets 40 are shown in FIGS. 1 and 2 to illustrate a plurality of possible target positions that could result in the return of a reflected laser pulse to one of the channels $C_1$, $C_2$. More specifically, the targets 40, e.g. vehicle tires, are schematically illustrated in positions corresponding to the respective lanes $L_1$, $L_2$, $L_3$, $L_4$ of a roadway along each of the laser axes 61, 62 of each channel $C_1$, $C_2$.

The source and receiver for first laser channel $C_1$ are not shown in the side view of FIG. 2 because the first laser axis 61 is substantially parallel to the second laser axis 62 and the respective laser axes 61, 62 lie substantially in a common horizontal plane. As is illustrated in FIG. 1, the first laser axis is offset from the second laser axis in the common horizontal plane by a laser channel offset distance x. The first and second laser sources $T_1$, $T_2$ and the first and second laser receivers $R_1$, $R_2$ need not comprise separate sources/detectors dedicated to each channel. Rather, it is contemplated that suitable optics and control circuitry can be provided to utilize a single laser source and a single detector for both channels.

According to one embodiment of the present invention, the programmable controller 24 is configured to generate a reflected laser pulse count corresponding to reflection of a pulsed laser signal 51, 52 from a target 40 positioned along one of the laser axes 61, 62. The reflected signal 71, 72 including one or more reflected pulses is then identified as a valid or an invalid target by comparing the pulse count to a predetermined valid target count. The number of pulse counts for valid targets such as tires on vehicles moving at road speeds will generally differ from the number of pulse counts for invalid targets such as stationary debris or low-hanging vehicle components.

Although a variety of suitable pulse repetition frequencies are contemplated by the present invention, it is noted that the programmable controller 24 can be is configured to generate the first and second laser signals 51, 52 at a pulse repetition frequency of between about 5 kHz and about 10 kHz and a pulse duration of less than about 20 ns. Alternatively, a suitable pulse repetition frequency PRF can be established with reference to the following approximation, where v corresponds to an expected average target speed, x corresponds to the channel offset distance, and p corresponds to the desired percent precision in the speed determination:

$$PRF \approx \left(\frac{v}{px}\right).$$

It is contemplated that expected average target speeds may range from about 5 mph (8 km/h) to well over 85 mph (135 km/h). The channel offset distance x may also vary widely but where compact configurations are desirable, the channel offset distance x will be less than about 3 ft (90 cm) or, more preferably, about 1 ft (30 cm).

Figure 3:
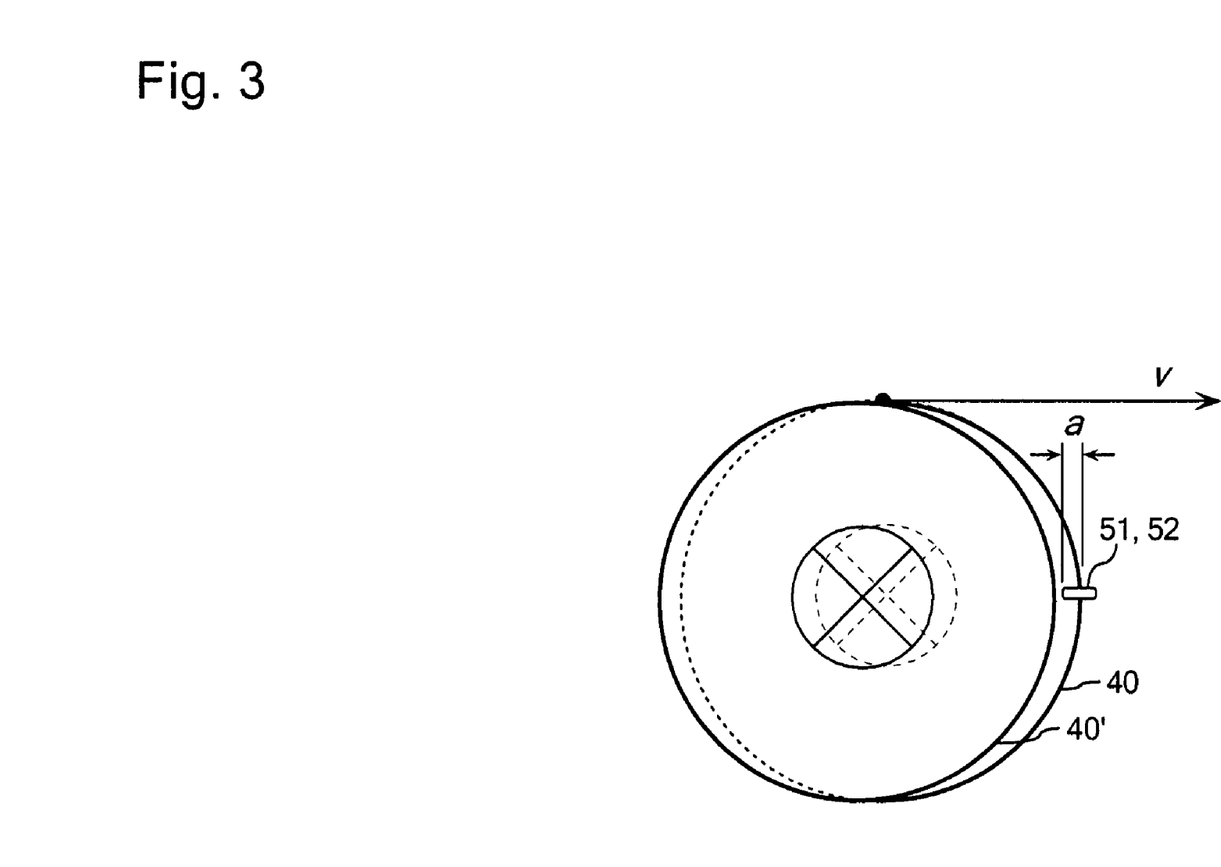
FIG. 3 is a schematic illustration of the manner in which a target intercepts a pulsed laser signal according to one embodiment of the present invention.

Referring additionally to FIG. 3, according to some embodiments of the present invention, the programmable controller 24 is configured to generate the first and second laser signals 51, 52 at a pulse repetition frequency sufficient to generate a plurality of reflected pulses 71, 72 as a small portion Δx of a target 40 to be detected intercepts an expanded cross-sectional profile of one of the laser signals 51, 52. Requiring a plurality of detected intercepts minimizes false detections from invalid target reflections (e.g., vehicle mud flaps) and enables control of target occlusion sensitivity. The extent to which a target 40 travels across the one of the signal beams 51, 52 will depend upon the specific nature of the target to be detected and the degree to which a particular user wishes to account for target occlusion. For example, in the context where the target 40 is an automobile wheel, it is likely to be desirable to generate a plurality of reflected pulses 71, 72 as less than 4 inches (10 cm) of a wheel moving at a speed v between about 25 mph (40 km/h) and about 55 mph (90 km/h) intercepts a signal beam 51, 52. More particularly, where the nature of the traffic under inspection demands enhanced accounting for occlusion of a vehicle wheels 40 in one lane by a wheel 40' in another lane, the pulse repetition frequency should be sufficient to generate a plurality of reflected pulses, perhaps as many as 8–16, as less than 1 inch (2.5 cm) of a tire moving at a speed v of about 55 mph (90 km/h) intercepts the signal beam 51, 52. These illustrations of suitable pulse repetition frequencies should not in any way be taken to limit the contemplated range of vehicle speeds suitable for detection. As is stated above, It is contemplated that expected average target speeds may range from about 5 mph (8 km/h) to well over 85 mph (135 km/h).

The programmable controller 24 can be further configured to reject signal reflections of invalid targets, i.e., small targets, such as mud flaps, generating less than the minimum number of reflected pulses required to meet a valid target threshold. Reflected pulse counting may subsequently be re-initiated following a number of receiver-disabled counts sufficient in quantity to substantially decrease the likelihood of further reflections from the invalid target. For example, and not by way of limitation, where a pulse count of 16 corresponds to a valid target, the controller 24 can be configured to disable the receiver for the equivalent of 16 additional pulse counts.

As a mechanism for reducing power requirements and reducing the likelihood of optical crosstalk between the channels $C_1$, $C_2$, the controller can be programmed to enable generation and detection in one of the first and second laser channels $C_1$, $C_2$ while inhibiting generation and detection in the other of the first and second laser channels $C_1$, $C_2$. In this manner, the controller 24 can alternate generation of the first and second pulsed laser signals 51, 52 along the respective first and second laser axes 61, 62.

To identify target range or, more specifically, the lane L1, L2, L3, L4 in which a vehicle's wheel 40 is present, the programmable controller 24 can be configured to determine the time-of-flight $TOF_1$, $TOF_2$, $TOF_3$, $TOF_4$, of a reflected laser pulse 71, 72 and correlate the time-of-flight with one of the predetermined roadway lanes L1, L2, L3, L4. To avoid detection of reflected pulses returning from object beyond a range of interest, e.g., beyond the particular roadway lanes of interest, the programmable controller 24 can be configured to establish a maximum timing gate width $T_{G(max)}$ for the detection of reflected laser pulses. The timing gate width $T_{G(max)}$ corresponds to:

$$T_{G(max)} \approx 2R_{max}/c$$

where $R_{max}$ corresponds to a maximum detection range for the predetermined roadway lanes L1, L2, L3, L4 and c is the speed of light.

The programmable controller 24 can also be programmed to utilize a counter to determine the respective times-of-flight $TOF_1$, $TOF_2$, $TOF_3$, $TOF_4$. Preferably, the counter defines counting increments of less than about 8 ns. Applications of the present invention requiring more precision in range measurement would utilize counters defining counting increments of substantially less than 8 ns. The programmable controller may also be configured to determine the respective times-of-flight $TOF_1$, $TOF_2$, $TOF_3$, $TOF_4$ by accounting for a laser firing delay $T_M$ and a roadway offset delay $T_O$ corresponding to the distance that the lane monitor 20 is offset from the roadway.

Where two channels $C_1$, $C_2$ are used, the programmable controller 24 can be configured to (i) identify successive reflected laser pulses 71, 72 correlated with a common roadway lane and received by different ones of the first and second receivers and (ii) determine vehicle speed v from an elapsed time between the successive reflected laser pulses 71, 72. Specifically, referring to FIG. 1, a target 40 in lane L4, at time $t_1$, will generate reflected laser pulses 71 received in the first laser channel $C_1$. At time $t_2$, the target 40, still present in lane L4, will generate reflected laser pulses 72 received in the second laser channel $C_2$. Given the known offset distance x, the controller 24 may be programmed to calculate the speed v of the target 40 simply by determining the time elapsed between $t_1$ and $t_2$. It is contemplated, however, that the present invention is not limited to utilization of dual laser channels.

The programmable controller 24 can be configured to convert the time-of-flight correlations to a simulated contact switch signal and transmit the simulated contact switch signal to the host traffic counting unit 30. This aspect of the present invention is particularly advantageous when the lane monitoring device 20 of the present invention is to be used with a host 30 that is configured to input contact switch signals from conventional contact switch traffic monitoring devices and determine vehicle classification and velocity from the simulated contact switch signals. Of course, it is contemplated that the programmable controller 24 can also be configured to function as a stand alone traffic counting unit. In which case, calculations such as vehicle speed, vehicle type, vehicle count data, etc., would be executed by the controller 24.

It is further contemplated that the programmable controller 24 can be configured to generate laser signals at a pulse repetition frequency PRF that varies as a function of a detected vehicle speed. More specifically a signal indicative of vehicle speed, as determined by the host 30, by a stand alone traffic counting unit, or other means, may be input by the controller 24 and used to optimize the pulse repetition frequency PRF.

It is noted that laser pulses 51, 52 reflected from portions of a target 40 characterized by differing reflectivity will return to the receiver $R_1$, $R_2$ with different signal intensity profiles. The difference in the signal intensity profiles could potentially skew the time-of-flight calculations discussed above. To account for this potential source of error, the lane monitor 20 can be configured to comprise one or more constant fraction discrimination circuits configured to account for differences in respective rise times of laser pulses 71, 72 reflected from surfaces of differing reflectivity at a common range. The constant fraction discrimination circuit can be configured to combine a detected reflected signal pulse with a delayed, inverted replica of the pulse to obtain a signal that is substantially independent of pulse amplitude.

The lane monitor 20 may also comprise a spectral filter associated with each laser receiver $R_1$, $R_2$ to block background radiation. The lane monitor can also be configured to utilize AC coupling to suppress ambient background radiation detected by the first and second laser receivers $R_1$, $R_2$. Although a variety of laser receivers would be suitable for use in the present invention, according to one embodiment of the present invention, the lane monitor 20 comprises an avalanche photodiode associated with each laser receiver $R_1$, $R_2$ and a temperature-compensated power supply for properly biasing the photodiode.

In many applications of the present invention, particularly those where target detection is to be limited to the lower portion of a vehicle wheel, the first and second laser sources $T_1$, $T_2$ are configured to generate pulsed laser signals characterized by substantially mono-directional divergence in a horizontal plane. In this manner, the divergence of the laser signal is limited in the vertical direction and detection of false targets vertically higher than the lower portion of the vehicle wheel can be eliminated or reduced. More specifically, laser sources are often configured to generate a pulsed laser signal having a cross sectional beam profile that is characterized by major axis of divergence and a minor axis of divergence. According to one embodiment of the present invention, the laser source is configured such that the major axis of divergence lies in a substantially horizontal plane.

Cross sectional beam profiles of laser signals are also often characterized by dissimilar substantially non-linear edge profiles. These dissimilar non-linear edge profiles can introduce error into the velocity and time-of-flight determinations of the present invention. Accordingly, one embodiment of the present invention is directed at ensuring that the generated pulsed laser signals are characterized by cross-sectional profiles defining substantially vertical edges. The beam may be configured to have substantially vertical edges by utilizing a beam shaping aperture, beam shaping optics, or some other suitable means.

To enhance the accuracy of the velocity and time-of-flight determinations according to the present invention, the respective laser sources $T_1$, $T_2$ and receivers $R_1$, $R_2$ may be configured to define a substantially co-axial configuration (illustrated in FIG. 2) or an offset configuration. If co-axial configuration is impractical or otherwise undesirable and the source and receiver define an offset configuration, the offset of the respective sources and receivers may be compensated for by configuring the fields of view of the receiver to account for the offset. More specifically, as is illustrated in FIG. 2, the field of view defined by the laser receiver can be tilted relative to the horizontal plane and/or truncated. In addition, regardless of whether the source and receiver define an offset or co-axial configuration, the field of view of the receiver can be configured to avoid inclusion of reflections originating from points substantially above a horizontal plane of the receiver, as is illustrated in FIG. 2. In the case of traffic monitoring by selection of vehicle wheels as potential targets 40, laser sources according to the present invention may be configured such that first and second laser axes are about 15 cm above a road surface adjacent the lane monitor 20.

To further enhance accuracy, where the lane monitor 20 of the present invention utilizes dual laser channels $C_1$, $C_2$, the first and second laser sources $T_1$, $T_2$ are configured such that the first and second laser axes 61, 62 are substantially parallel, lie at substantially identical elevations, and define a substantially equal cross-sectional areas. Although a variety of suitable transmission wavelengths are contemplated by the present invention, according to some embodiments of the present invention, laser sources are configured to operate in one of the following bands: from about 700 nm to about 1050 nm; and from about 1500 nm to about 1800 nm.

To limit ocular exposure, laser sources according to the present invention may be provided with beam expansion optics configured to increase respective beam diameters of the pulsed laser signals, e.g., to at least about 2.5 cm within a detection range of a set of predetermined roadway lanes. It may also be desirable to limit ocular exposure by generating laser signals at a laser irradiance no greater than about 100 mW/cm$^2$ for a wavelength of about 1550 nm and no greater than about 1 mW/cm$^2$ for wavelengths of between about 700 nm and about 1050 nm.

The user interface 22 can be configured to permit a user to generate inputs for roadway offset, lane width, number of lanes, and combinations thereof. The user interface 22 may also comprise a visual indicator, e.g. a series of LEDs, configured to provide an indication of detection of a reflected laser pulse and a lane number corresponding to the detected pulse. In certain applications of the present invention, it may be preferable to disable the visual indicators upon passage of a predetermined operational time duration, e.g., a test or set-up time, and refresh the visual indicators upon generation of a refresh signal at the user interface.

Preferably, the lane monitor 20 is configured to permit azimuth and elevation adjustment of each laser source $T_1$, $T_2$. To this end, the lane monitor 20 may include adjustable legs 26 and an alignment telescope 28 configured to facilitate orientation of the first and second laser sources $T_1$, $T_2$. The lane monitor 20 may also comprise a solar panel 25 mounted thereto for generation of electrical power for consumption by the lane monitor 20.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue. For example, where it is stated herein that the first laser axis is "substantially" parallel to the second laser axis and that the first and second laser axes lie "substantially" in a common horizontal plane, it is implicitly acknowledged that the present invention contemplates insignificant variations from precisely parallel axes and precise positioning in a common horizontal plane.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A traffic monitoring system comprising a non-intrusive lane monitor, said lane monitor comprising first and second laser channels, a user interface, and a programmable controller in communication with said first and second laser channels and said user interface, wherein:
    said first laser channel comprises a first laser source and a first laser receiver;
    said first laser source is configured to generate a first pulsed laser signal along a first laser axis;
    said first laser receiver is configured to detect individual reflected laser pulses from said first pulsed laser signal;
    said second laser channel comprises a second laser source and a second laser receiver;
    said second laser source is configured to generate a second pulsed laser signal along a second laser axis;
    said second laser receiver is configured to detect individual reflected laser pulses from said second pulsed laser signal;
    said first laser axis is substantially parallel to said second laser axis;
    said first and second laser axes lie substantially in a common horizontal plane;
    said first laser axis is offset from said second laser axis in said common horizontal plane by a laser channel offset distance x; and
    said programmable controller is configured to:
        generate reflected laser pulse count corresponding to reflection of a pulsed laser signal from a target positioned along one of said laser axes, and
        identify said reflected signal as a valid or invalid target by comparing said pulse count to a predetermined valid target count.

2. A traffic monitoring system as claimed in claim 1 wherein said programmable controller is configured to generate said first and second laser signals at a pulse repetition frequency of between about 5 kHz and about 10 kHz.

3. A traffic monitoring system as claimed in claim 1 wherein said programmable controller is configured to generate said first and second laser signals at a pulse repetition frequency of between about 5 kHz and about 10 kHz and a pulse duration of less than about 20 ns.

4. A traffic monitoring system as claimed in claim 1 wherein said programmable controller is configured to generate said first and second laser signals at a pulse repetition frequency PRF that varies as a function of a detected vehicle speed.

5. A traffic monitoring system as claimed in claim 1 wherein said programmable controller is configured to generate said first and second laser signals at a pulse repetition frequency PRF of at least about:

$$PRF \approx \left(\frac{v}{px}\right)$$

where v corresponds to an expected average target speed, x corresponds to the channel offset distance and p corresponds to the desired percent precision in the speed determination.

6. A traffic monitoring system as claimed in claim 4 wherein said expected average target speed is at least about 5 mph (40 km/h).

7. A traffic monitoring system as claimed in claim 4 wherein said channel offset distance x is less than about 3 ft (90 cm).

8. A traffic monitoring system as claimed in claim 4 wherein said channel offset distance x is about 1 ft (30 cm).

9. A traffic monitoring system as claimed in claim 4 wherein said channel offset distance x is less than about 3 ft (90 cm) and said expected average target speed v is at least about 25 mph (40 km/h).

10. A traffic monitoring system as claimed in claim 4 wherein said channel offset distance x is about 1 ft (30 cm) and said expected average target speed v is about 55 mph (90 km/h).

11. A traffic monitoring system as claimed in claim 1 wherein said programmable controller is configured to generate said first and second laser signals at a pulse repetition frequency sufficient to generate a plurality of reflected pulses as less than 4 inches (10 cm) of a target moving at a speed v intercepts one of said pulsed laser signals, said speed v being at least about 25 mph (40 km/h).

12. A traffic monitoring system as claimed in claim 11 wherein said pulse repetition frequency is sufficient to generate said plurality of reflected pulses as less than 3 inches (7.5 cm) of a target moving at a speed v intercepts one of said pulsed laser signals.

13. A traffic monitoring system as claimed in claim 11 wherein said pulse repetition frequency is sufficient to generate said plurality of reflected pulses as less than 1 inch (2.5 cm) of a target moving at a speed v intercepts one of said pulsed laser signals.

14. A traffic monitoring system as claimed in claim 11 wherein said speed v is at least about 55 mph (90 km/h).

15. A traffic monitoring system as claimed in claim 11 wherein said pulse repetition frequency is sufficient to generate at least eight reflected pulses as less than 4 inches (10 cm) of a target moving at a speed v intercepts one of said pulsed laser signals, said speed v being at least about 25 mph (40 km/h).

16. A traffic monitoring system as claimed in claim 15 wherein said speed v is at least about 55 mph (90 km/h).

17. A traffic monitoring system as claimed in claim 11 wherein said pulse repetition frequency is sufficient to generate at least sixteen reflected pulses as less than 4 inches (10 cm) of a target moving at a speed v intercepts one of said pulsed laser signals, said speed v being at least about 25 mph (40 km/h).

18. A traffic monitoring system as claimed in claim 17 wherein said speed v is at least about 55 mph (90 km/h).

19. A traffic monitoring system as claimed in claim 11 wherein said pulse repetition frequency is sufficient to generate greater than 8 reflected pulses as less than 1 inch (2.5 cm) of a target moving at a speed v intercepts one of said pulsed laser signals, said speed V being at least about 55 mph (90 km/h).

20. A traffic monitoring system as claimed in claim 1 wherein said programmable controller is configured to:
reject signal reflections of invalid targets; and
re-initiate reflected pulse counting following a number of receiver-disabled counts sufficient in quantity to substantially decrease the likelihood of further reflections from said invalid target.

21. A traffic monitoring system as claimed in claim 1 wherein said controller is programmed to:
enable generation and detection in one of said first and second laser channels while inhibiting generation and detection in the other of said first and second laser channels; and
alternate said generation of said first and second pulsed laser signals along said respective first and second laser axes.

22. A traffic monitoring system as claimed in claim 1 wherein said programmable controller is configured to determine respective times-of-flight of said reflected laser pulses and correlate said respective times-of-flight with predetermined roadway lanes.

23. A traffic monitoring system as claimed in claim 22 wherein said programmable controller is configured to establish a maximum timing gate width $T_{G(max)}$ for detection of said reflected laser pulses that corresponds to:

$$T_{G(max)} \approx 2R_{max}/c$$

where $R_{max}$ corresponds to a maximum detection range for said predetermined roadway lanes and c is the speed of light.

24. A traffic monitoring system as claimed in claim 22 wherein said programmable controller is configured to convert said time-of-flight correlations to a simulated contact switch signal and transmit said simulated contact switch signal to a host traffic counting unit.

25. A traffic monitoring system as claimed in claim 22 wherein said programmable controller is configured to determine said respective times-of-flight by accounting for a laser firing delay $T_M$ and a roadway offset delay $T_O$ of said lane monitor.

26. A traffic monitoring system as claimed in claim 22 wherein said programmable controller is configured to:
identify successive reflected laser pulses correlated with a common roadway lane and received by different ones of said first and second receivers; and
determine vehicle speed from an elapsed time between said successive reflected laser pulses.

27. A traffic monitoring system as claimed in claim 1 wherein said first and second laser sources are configured to generate pulsed laser signals characterized by substantially mono-directional divergence in a horizontal plane.

28. A traffic monitoring system as claimed in claim 1 wherein:
said first and second laser sources are configured to generate pulsed laser signals having cross sectional beam profiles characterized by respective major axes of divergence; and
said first and second laser sources are configured such that said major axes of divergence lie in a substantially horizontal plane.

29. A traffic monitoring system as claimed in claim 1 wherein said first and second laser sources are configured to:
generate pulsed laser signals along a horizontal plane; and
generate pulsed laser signals characterized by cross-sectional profiles defining substantially vertical edges.

30. A traffic monitoring system as claimed in claim 1 wherein:
said first laser source and said first laser receiver define a substantially co-axial configuration; and
said second laser source and said second laser receiver define a substantially co-axial configuration.

31. A traffic monitoring system as claimed in claim 1 wherein:
said first laser source and said first laser receiver define an offset configuration;
said second laser source and said second laser receiver define an offset configuration; and
said offset of said respective sources and receivers is compensated for by configuring respective fields of view of said receivers to account for said offset.

32. A traffic monitoring system as claimed in claim 1 wherein respective fields of view of said receivers are configured to avoid inclusion of reflections originating from points substantially above a horizontal plane of said receivers.

33. A traffic monitoring system as claimed in claim 32 wherein said respective fields of view defined by said first and second laser receivers are configured by truncating said fields of view, tilting said fields of view relative to a horizontal plane, or combinations thereof.

34. A traffic monitoring system as claimed in claim 1 wherein said first and second laser sources are configured such that first and second laser axes are substantially parallel, lie at substantially identical elevations, and define a substantially equal cross-sectional areas.

35. A traffic monitoring system as claimed in claim 1 wherein said laser channel offset distance x is between about 15 cm and about 90 cm.

36. A traffic monitoring system as claimed in claim 1 wherein said first and second laser sources comprise beam expansion optics configured to increase respective beam diameters of said pulsed laser signals to at least about 2.5 cm within a detection range of a set of predetermined roadway lanes.

37. A traffic monitoring system as claimed in claim 1 wherein said first and second laser sources are configured to generate said first and second laser signals at a laser irradiance no greater than about 100 mW/cm$^2$ for a wavelength of about 1550 nm.

38. A traffic monitoring system as claimed in claim 1 wherein said first and second laser sources are configured to generate said first and second laser signals at a laser irradiance no greater than about 1 mW/cm$^2$ for wavelengths of between about 700 nm and about 1050 nm.

39. A traffic monitoring system as claimed in claim 1 wherein said lane monitor comprises at least one constant fraction discrimination circuit configured to account for differences in respective rise times of laser pulses reflected from surfaces of differing reflectivity at a common range.

40. A traffic monitoring system as claimed in claim 39 wherein said constant fraction discrimination circuit is configured to combine a detected reflected signal pulse with a delayed, inverted replica to obtain a signal that is substantially independent of pulse amplitude.

41. A traffic monitoring system as claimed in claim 1 wherein said lane monitor comprises a spectral filter associated with each laser receiver to block background radiation.

42. A traffic monitoring system as claimed in claim 1 wherein said user interface is configured to permit a user to generate inputs for roadway offset, lane width, number of lanes, and combinations thereof.

43. A traffic monitoring system as claimed in claim 1 wherein said user interface comprises a visual indicator configured to provide an indication of detection of a reflected laser pulse and a lane number corresponding to said detected pulse.

44. A traffic monitoring system as claimed in claim 1 wherein said non-intrusive lane monitor is configured to generate simulated contact switch signals from said reflected laser pulses and transmit said simulated contact switch signals to a host traffic counting unit.

45. A traffic monitoring system as claimed in claim 44 wherein said host is configured to determine vehicle classification and velocity from said simulated contact switch signals.

46. A traffic monitoring system as claimed in claim 1 wherein said lane monitor is configured to permit azimuth and elevation adjustment of each laser source.

47. A traffic monitoring system as claimed in claim 1 wherein said lane monitor comprises adjustable legs and an alignment scope configured to facilitate orientation of said first and second laser sources.

48. A traffic monitoring system as claimed in claim 1 wherein said lane monitor comprises a solar panel mounted thereto, said solar panel configured to generate electrical power for consumption by said lane monitor.

49. A traffic monitoring system comprising a non-intrusive lane monitor, said lane monitor comprising first and second laser channels, a user interface, and a programmable controller in communication with said first and second laser channels and said user interface, wherein:
   said first laser channel comprises a first laser source and a first laser receiver;
   said first laser source is configured to generate a first pulsed laser signal along a first laser axis;
   said first laser receiver is configured to detect individual reflected laser pulses from said first pulsed laser signal;
   said second laser channel comprises a second laser source and a second laser receiver;
   said second laser source is configured to generate a second pulsed laser signal along a second laser axis;
   said second laser receiver is configured to detect individual reflected laser pulses from said second pulsed laser signal;
   said first laser axis is substantially parallel to said second laser axis;
   said first and second laser axes lie substantially in a common horizontal plane;
   said first laser axis is offset from said second laser axis in said common horizontal plane by a laser channel offset distance x; and
   said programmable controller is configured to generate said first and second laser signals at a pulse repetition frequency PRF of at least about:

$$PRF \approx \left(\frac{v}{px}\right)$$

where v corresponds to an expected average target speed, x corresponds to the channel offset distance and p corresponds to the desired percent precision in the speed determination.

50. A traffic monitoring system comprising a non-intrusive lane monitor, said lane monitor comprising at least one laser channel, a user interface, and a programmable controller in communication with said laser channel and said user interface, wherein:
   said laser channel comprises a laser source and a laser receiver;
   said laser source is configured to generate a pulsed laser signal along a laser axis;
   said laser receiver is configured to detect individual reflected laser pulses from said pulsed laser signal;
   said laser source is configured to generate pulsed laser signals having a cross sectional beam profile characterized by a minor axis of divergence and a major axis of divergence; and
   said laser source is configured such that said minor axis of divergence lies in a substantially vertical plane said major axis of divergence lies in a substantially horizontal plane.

51. A traffic monitoring system as claimed in claim 50 wherein said first and second laser sources are configured to:
   generate pulsed laser signals along a horizontal plane; and
   generate pulsed laser signals characterized by cross-sectional profiles defining substantially vertical edges.

52. A traffic monitoring system comprising a non-intrusive lane monitor, said lane monitor comprising at least one laser channel, a user interface, and a programmable controller in communication with said laser channel and said user interface, wherein:
- said laser channel comprises a laser source and a laser receiver;
- said laser source is configured to generate a pulsed laser signal along a laser axis;
- said laser receiver is configured to detect individual reflected laser pulses from said pulsed laser signal; and
- said programmable controller is configured to:
  - generate reflected laser pulse count corresponding to reflection of a pulsed laser signal from a target positioned along one of said laser axes, and
  - identify said reflected signal as a valid or invalid target by comparing said pulse count to a predetermined valid target count.

53. A traffic monitoring system comprising a non-intrusive lane monitor, said lane monitor comprising at least one laser channel, a user interface, and a programmable controller in communication with said laser channel and said user interface, wherein:
- said laser channel comprises a laser source and a laser receiver;
- said laser source is configured to generate a pulsed laser signal along a laser axis;
- said laser receiver is configured to detect individual reflected laser pulses from said pulsed laser signal; and
- said programmable controller is configured to generate said first and second laser signals at a pulse repetition frequency sufficient to generate a plurality of reflected pulses as less than 1 inches (2.5 cm) of a target moving at a speed v intercepts one of said pulsed laser signals, said speed v being at least about 55 mph (90 km/h).

54. A traffic monitoring system comprising a non-intrusive lane monitor, said lane monitor comprising at least one laser channel, at least one constant fraction discrimination circuit, a user interface, and a programmable controller in communication with said laser channel, said constant fraction discrimination circuit, and said user interface, wherein:
- said laser channel comprises a laser source and a laser receiver;
- said laser source is configured to generate a pulsed laser signal along a laser axis;
- said laser receiver is configured to detect individual reflected laser pulses from said pulsed laser signal;
- said laser receiver is in communication with said constant fraction discrimination circuit;
- said constant fraction discrimination circuit is configured to account for differences in respective rise times of laser pulses reflected from surfaces of differing reflectivity at a common range; and
- said constant fraction discrimination circuit is configured to combine a detected reflected signal pulse with a delayed, inverted replica to obtain a signal that is substantially independent of pulse amplitude.

* * * * *

UNITED STATES PATENT AND TRADEMARK OFFICE
CERTIFICATE OF CORRECTION

PATENT NO. : 7,107,144 B2
APPLICATION NO. : 10/787850
DATED : September 12, 2006
INVENTOR(S) : Capozzi et al.

It is certified that error appears in the above-identified patent and that said Letters Patent is hereby corrected as shown below:

Col. 9, line 48, "V" should read --v--.

Signed and Sealed this

Tenth Day of April, 2007

JON W. DUDAS
*Director of the United States Patent and Trademark Office*